United States Patent
Gray et al.

(10) Patent No.: US 12,346,974 B1
(45) Date of Patent: Jul. 1, 2025

(54) SYSTEMS AND METHODS FOR DETECTING ITEMS AT A PROPERTY

(71) Applicant: United Services Automobile Association (USAA), San Antonio, TX (US)

(72) Inventors: Emily Margaret Gray, San Antonio, TX (US); Daniel Christopher Bitsis, Jr., San Antonio, TX (US); Qunying Kou, San Antonio, TX (US); Robert Wiseman Simpson, Fair Oaks Ranch, TX (US); Manfred Amann, San Antonio, TX (US); Donnette Moncrief Brown, San Antonio, TX (US); Eric David Schroeder, San Antonio, TX (US); Meredith Beveridge, San Antonio, TX (US); Michael J. Maciolek, Boerne, TX (US); Bobby Lawrence Mohs, San Antonio, TX (US); Brian F. Shipley, Plano, TX (US); Justin Dax Haslam, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/436,963

(22) Filed: Feb. 8, 2024

Related U.S. Application Data

(63) Continuation of application No. 17/564,478, filed on Dec. 29, 2021, now Pat. No. 11,928,741, which is a
(Continued)

(51) Int. Cl.
*G06Q 40/08* (2012.01)
*G06Q 50/163* (2024.01)
*G06V 20/20* (2022.01)

(52) U.S. Cl.
CPC .......... *G06Q 40/08* (2013.01); *G06Q 50/163* (2013.01); *G06V 20/20* (2022.01)

(58) Field of Classification Search
CPC ....... G06Q 40/08; G06Q 50/163; G06V 20/20
(Continued)

(56) References Cited

U.S. PATENT DOCUMENTS 9,811,862 B1 * 11/2017 Allen ..................... G06Q 10/20
9,842,310 B2    12/2017 Lekas
(Continued)

FOREIGN PATENT DOCUMENTS

JP        2018530816 A  * 10/2018  ......... G06Q 10/0875

OTHER PUBLICATIONS

"Gladney, A storage subsystem for image and records management, Dec. 31, 1993, IBM Systems Journal, vol. 32, Issue: 3, 512-540" (Year: 1993).*

(Continued)

*Primary Examiner* — Abhishek Vyas
*Assistant Examiner* — Adam Hilmantel
(74) *Attorney, Agent, or Firm* — FLETCHER YODER P.C.

(57) ABSTRACT

A system may include a router that may receive a plurality of data packets from one or more devices that communicatively couples to the router. The system may also include at least one processor that identifies an identity of a device based on a data packet received by the router from the device, generate an insurance policy that includes the device in response to identifying the identity of the device, and sends a notification indicative of the insurance policy to a
(Continued)

computing device in response to generating the insurance policy.

20 Claims, 3 Drawing Sheets

Related U.S. Application Data continuation of application No. 16/824,535, filed on Mar. 19, 2020, now Pat. No. 11,216,889.

(60) Provisional application No. 62/821,269, filed on Mar. 20, 2019.

(58) Field of Classification Search
USPC .......................................................... 705/3–44
See application file for complete search history.

(56) References Cited

U.S. PATENT DOCUMENTS

| | | | |
|---|---|---|---|
| 9,872,088 | B2 | 1/2018 | Fadell et al. |
| 9,947,051 | B1 | 4/2018 | Allen et al. |
| 10,489,863 | B1 | 11/2019 | Matheson |
| 10,523,135 | B2 | 12/2019 | Ng et al. |
| 10,614,525 | B1 * | 4/2020 | Devereaux ............. G06Q 40/08 |
| 10,628,888 | B2 | 4/2020 | Feldman et al. |
| 10,672,508 | B2 | 6/2020 | Ansari et al. |
| 10,713,726 | B1 | 7/2020 | Allen et al. |
| 10,755,357 | B1 | 8/2020 | Davis et al. |
| 10,839,410 | B1 | 11/2020 | Devereaux et al. |
| 10,873,728 | B2 | 12/2020 | Child et al. |
| 11,386,498 | B1 | 7/2022 | Leise et al. |
| 2005/0159823 | A1 | 7/2005 | Hayes et al. |
| 2006/0241982 | A1 | 10/2006 | Seifert et al. |
| 2006/0259184 | A1 | 11/2006 | Hayes et al. |
| 2013/0195367 | A1 | 8/2013 | Ohira et al. |
| 2015/0025917 | A1 * | 1/2015 | Stempora ........... G02B 27/0093 705/4 |
| 2016/0125548 | A1 * | 5/2016 | Bowles .............. G06Q 30/0278 705/4 |
| 2017/0076408 | A1 | 3/2017 | D'Souza et al. |
| 2017/0193606 | A1 * | 7/2017 | Thomas ................. G06Q 40/08 |
| 2018/0047106 | A1 | 2/2018 | Snyder et al. |
| 2018/0158156 | A1 | 6/2018 | Dintenfass |
| 2019/0128771 | A1 | 5/2019 | Santarone et al. |
| 2020/0077892 | A1 | 3/2020 | Tran |
| 2020/0184278 | A1 | 6/2020 | Zadeh |
| 2020/0320231 | A1 | 10/2020 | Santarone |
| 2021/0407013 | A1 | 12/2021 | O'Shaughnessy et al. |

OTHER PUBLICATIONS

"Home Automation System Markets: Lighting Control & Access Control, HVAC Control, Entertainment—Global Forecast to 2025", M2 Presswire Feb. 2, 2021.

Alshammri, G., "IoT-Based Voice-Controlled Smart Homes with Source Separation based on Deep Learning," Department of Computer Science, Community College, king Saud University, Journal of Sensors 2023, Kindawi Limited (Year: 2023).

* cited by examiner

SYSTEMS AND METHODS FOR DETECTING ITEMS AT A PROPERTY

CROSS-REFERENCE TO RELATED APPLICATION

The present disclosure is a continuation of U.S. patent application Ser. No. 17/564,478, titled "Systems and Methods for Detecting Items and a Property," which was filed on Dec. 29, 2021, which is a continuation of U.S. patent application Ser. No. 16/824,535, titled "Systems and Methods for Detecting Items and a Property," which was filed on Mar. 19, 2020, and is now U.S. Pat. No. 11,216,889 issued on Jan. 4, 2022, which is related to, and claims priority to, U.S. Provisional Patent Application Ser. No. 62/821,269, titled "Systems and Methods for Detecting Items and a Property," which was filed on Mar. 20, 2019, and which is herein incorporated by reference in its entirety for all purposes.

BACKGROUND

The present disclosure relates generally to detecting various items that may be stored inside or outside a property. More specifically, the present disclosure relates to using a variety of sensors to determine types of items that may be stored at a property.

Collecting information regarding items that are present at a property may be cumbersome. That is, identifying the various different items that may be stored or present at a property may prove to be a time-intensive undertaking. In addition, identifying each item at a property may be difficult, as certain items may be positioned in a manner that may not be clearly visible to someone. As such, improved systems and methods for detecting items at a property are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a router that may receive a plurality of data packets from one or more devices that communicatively couples to the router. The system may also include at least one processor that identifies an identity of a device based on a data packet received by the router from the device, generate an insurance policy that includes the device in response to identifying the identity of the device, and sends a notification indicative of the insurance policy to a computing device in response to generating the insurance policy.

In another embodiment, a method may include receiving a plurality of data packets from one or more devices configured to communicatively couple to a router. The method may also involve identifying one or more identities of the one or more devices based on one or more data packets of the plurality of data packets, generating an insurance policy that includes the one or more devices in response to identifying the one or more identities of the one or more devices, and sending a notification indicative of the insurance policy to a computing device in response to generating the insurance policy.

In yet another embodiment, a non-transitory computer-readable medium may include computer-executable instructions that, when executed, cause a processor to perform operations including receiving audio data representative of one or more commands to control an operation of a device, receiving image data via one or more sensors disposed at a plurality of locations in a structure, and identifying the device based on the audio data and the image data. The processor may then generate an insurance policy that includes the device in response to identifying the device and send a notification indicative of the insurance policy to a computing device in response to generating the insurance policy.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When insuring items stored at a property (e.g., business, home), individuals may walk through the respective property and tabulate a list of items that they intend to include on an insurance policy or for their own inventory of items stored at the property. This process may be time consuming and inefficient. That is, individuals may miss items that may be obscured from view due to the positions of other items. In addition, when the individual identifying the items is not familiar with the property, the individual may often miss or disregard certain items that may be of value. Even if the list is generated by the property owner, the insurance policies created for these items may not be updated to include additional items that have been acquired by the property owner. As such, the presently disclosed techniques enable individuals to detect the presence of various objects stored at the property at various times to ensure that a corresponding insurance policy is updated to include each of the items stored at the property. Additional details with regard to automatically detecting items stored at a property will be discussed below with reference to FIGS. 1-5.

Figure 1:
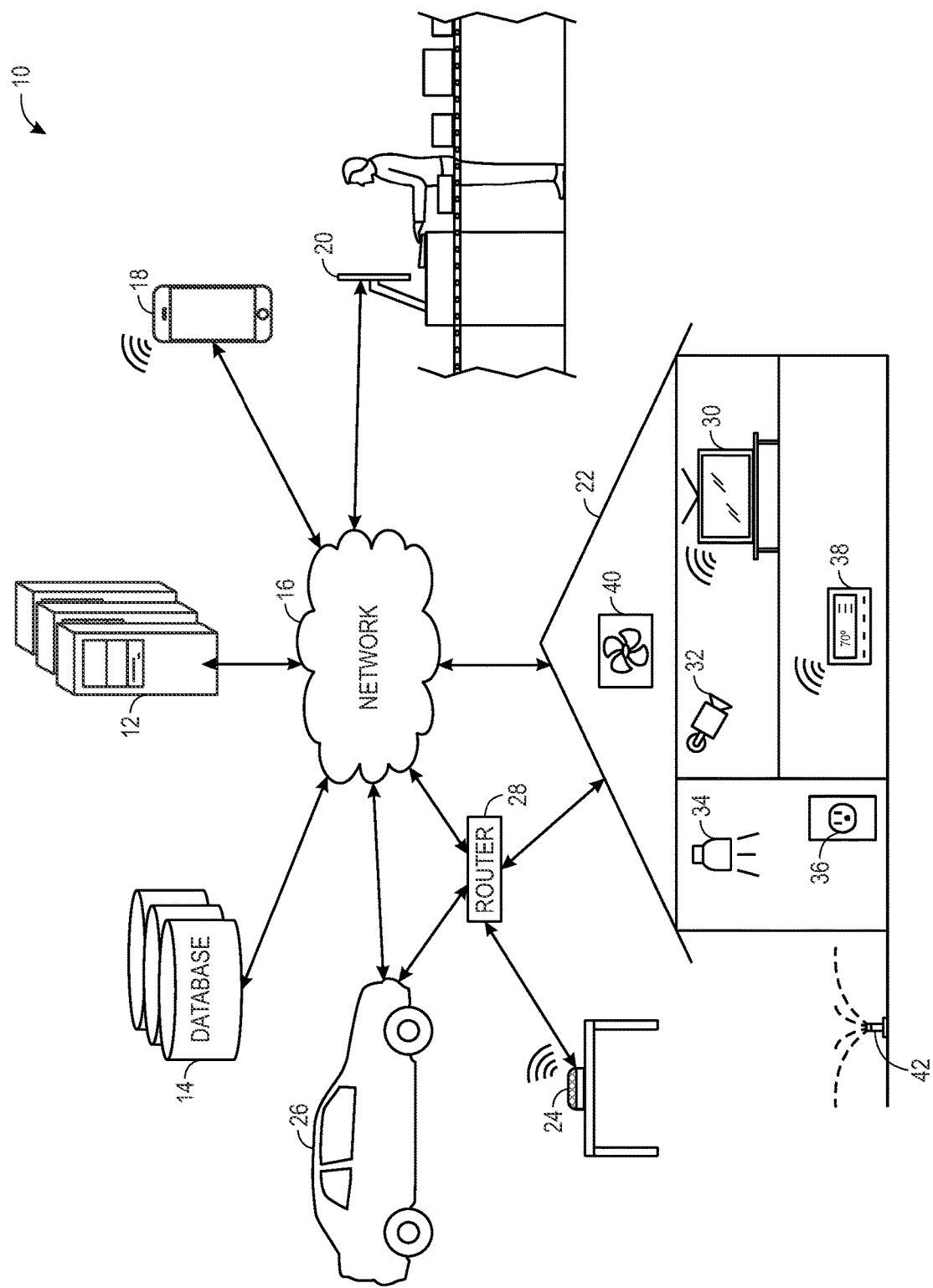
FIG. 1 illustrates a block diagram of an inventory detection network that includes a number of devices communicatively coupled to a network, in accordance with embodiments described herein.
Figure 2:
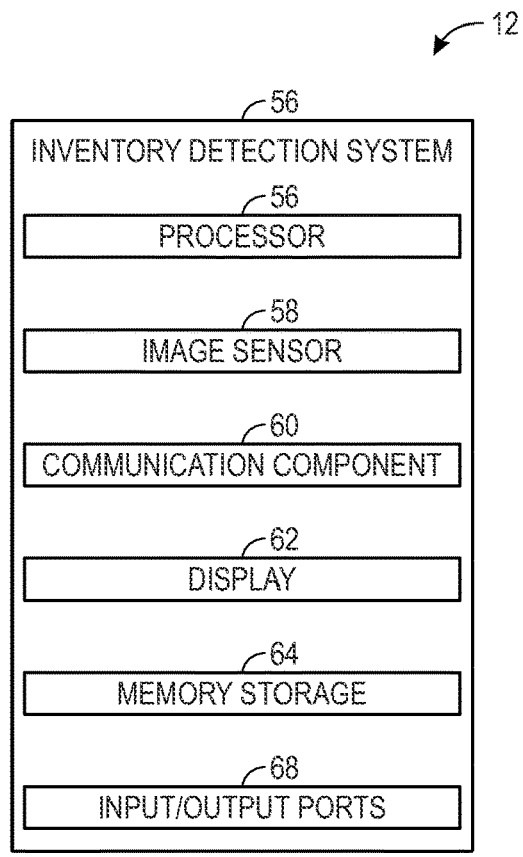
FIG. 2 illustrates a block diagram of a inventory detection system communicatively coupled to the inventory network of FIG. 1, in accordance with embodiments described herein.

By way of introduction, FIG. 1 is a block diagram of an inventory detection network 10 that includes an inventory detection system 12, one or more databases 14, a network 16, a mobile computing device 18, a computing device 20, various electronic devices stored inside or outside a property 22, a smart speaker 24, a vehicle 26, and the like. Although the inventory detection system 12 is illustrated as being coupled to the various components depicted in FIG. 1 via the network 16, it should be noted that the inventory detection system 12 may be communicatively coupled to a variety of data sources in a variety of manners (e.g., directly) to perform the embodiments described herein. The inventory detection system 12 may include any suitable computer device, such as a general-purpose personal computer, a laptop computer, a tablet computer, a mobile computer, a smart phone device, a server, a cloud-computing system, and the like that is configured in accordance with present embodiments. Additional details with regard to example components that may be part of the inventory detection system 12 is described below with reference to FIG. 2.

In certain embodiments, the inventory detection system 12 may receive data from various data sources that may to assist the inventory detection system 12 in identifying various items or objects owned by an individual or entity (e.g., organization, business) associated with the property 22. In some embodiments, the data received by inventory detection system 12 may include data (e.g., image data, browser data) from the mobile computing device 18, financial transaction data (e.g., purchases) from the computing device 20, sensor data (e.g., image sensor, thermal sensor, electrical monitor sensor) from the various devices disposed inside and outside the property 22, audio data acquired by the smart speakers 24, navigation data from the vehicle 26, and the like. The data acquired by these various sources may be used by the inventory detection system 12 to identify items that may be stored at the property 22. The identified items may then be populated in an inventory list that may be used to secure an insurance policy that covers those items. In addition, as new items are detected in accordance to the embodiments described herein, the inventory detection system 12 may automatically modify the insurance policy to include the additional items. As such, the inventory detection system 12 may automatically modify a premium cost for the insurance policy as new items are detected and as other items are determined to be no longer stored at the property 22 or owned by the individual. In some embodiments, the inventory detection system 12 may send a notification to the mobile device 18 or other suitable computing device associated with the owner of the insurance policy to inform the owner of the modification. The notification, in some embodiments, may cause the mobile device 18 or other suitable computing device to automatically execute an application or program that updates or generates a visual notification, an audio notification, a haptic notification (e.g., vibration), or other suitable notification to enable the owner to learn about the modification in real time or near real time.

In some embodiments, the inventory detection system 12 may modify automatic payment schedules to withdraw the appropriate amount of funds to cover the presently detected items at regular intervals (e.g. weeks, months, quarters). In addition, the inventory detection system 12 may generate a visualization indicative of the newly detected items or indicative of the items that have been determined to be removed. The visualization may be provided to the mobile computing device 18 or another computing device associated with the owner of the property 22 to alert the user of the changes to the items that are to be covered under the respective insurance policy. In some embodiments, the inventory detection system 12 may send an alert that may automatically cause the mobile computing device 18 to execute a corresponding application stored therein, such that the application may provide an alert (e.g., visual, haptic, audible) for the user to become aware of the change. The user may then provide input to the application confirming whether or not the proposed changes to the policy are accurate.

With the foregoing in mind, it should be noted that the data received by the inventory detection system 12 may include a multitude of types of data. For example, the mobile computing device 18 may provide data related to the stores visited by a user based on positioning data (e.g., maps), social media data (e.g., checking into stores vis social media), or the like. In addition, the mobile computing device 18 may provide financial transaction data indicative of purchases made by the individual via an application stored on the mobile computing device 18 or the like.

In the same manner, the computing device 20 may provide financial transaction data regarding purchases made by the individual. As such, the computing device 20 may be any suitable computing device that facilitates the purchase of items or products from a store, organization, or the like. In some embodiments, the computing device 20 may send an indication to the inventory detection system 12 that specifies that the item was purchased at the store. In one embodiment, the purchase may be made using a credit card or an electronic wallet application. In this way, the inventory detection system 12 may receive data indicative of the sale amount in real time or in near real time (e.g., within seconds of the purchase). The data from the computing device 20 may provide an amount for each product purchased and a description or title for each product. As such, the inventory detection system 12 may have an initial cost value for each product that may be stored as part of an inventor list.

In addition to the computing device 20 that facilitates sales, the inventory detection system 12 may receive data from various devices that may be installed in or around the property 22. For example, the property 22 may include certain electronic devices that are capable of communicating to other components via the network 16. In some embodiments, the devices may communicate directly with the network 16, and the devices may also communicate to the network 16 via a router 28. The router 28 may be any suitable routing device that receives a collection of wireless signals (e.g., Wi-Fi signals, Bluetooth signals, WiMAX, LoRa, LoRaWAN, ZWave, ZWave+, Zigbee, Bluetooth, Bluetooth LE, NFC, WiFi HaLow, 5G, LTE, LTE-M, NB-IoT, other suitable wireless signals) and routes or directs the signals to appropriate destinations or devices. In some embodiments, the router 28 may receive packets of data from various devices, such that the packets may provide details with regard to the device sending the packet. For instance, the details may include a manufacturer, a product model, a firmware revision, and other details regarding the device transmitting the packet. The inventory detection system 12 may use the information provided by these devices to generate the inventory list described below.

Referring back to the devices within the property 22, some example devices may include a television 30, an image sensor 32, a smart light 34, a smart plug 36, a smart thermostat 38, a smart attic fan 40, a smart sprinkler 42, and the like. Each of the devices listed as associated with the property 22 may include circuitry that is capable of communicating with the network 16, monitoring certain operations performed by the respective device, being remotely controlled, and the like. Generally, the inventory detection system 12 may ascertain that a respective device is stored at the property 22 when it receives data representative of the respective device's communication with the network 16 or the router 28 more than a threshold amount of times or with a certain pattern. That is, the inventory detection system 12 may disregard the devices that communicate within the property 22 at irregular intervals because these devices may be associated with other users who visit the property and their respective devices may not be owned by the property owner. Instead, the inventory detection system 12 may verify that the device that is believed to be stored at the property is indeed stored at the property by receiving data from the respective device at regular intervals that would be difficult for the respective devices to perform if they were not stored at the property 22. In some embodiments, the inventory detection system 12 may send a ping or wake up message to the respective devices at various times (e.g., night, between 12 a.m. and 4 a.m.) to cause the respective devices to respond with a response packet. In this way, the inventory detection system 12 may verify that the devices are stored at the property 22.

In some instances, the devices in the property 22 may include image sensors that use image recognition technology to identify items stored in the property 22. In addition, other types of image sensor technology, such as thermal sensors, infrared sensors, and the like, may be employed in the techniques described below to detect items stored in or outside of the property 22.

In addition to the devices listed above, the smart speakers 24 may include voice controlled audio devices that respond to audible commands spoken to the device. The smart speakers 24 may be used to automate control to other smart devices that may be connected to the network 16 or the router 28. The smart speakers 24 may include audio processing circuitry that records voice data and other audio data that may be present around its surrounding. As such, the audio data acquired by the smart speakers 24 or via other sound sensors disposed at the property 22 may be used by the inventory detection system 12 to detect when new items are stored at the property. That is, the inventory detection system 12 may detect a new device stored at the property based on a distinct sound or sound waves produced by the device. The inventory detection system 12 may, for example, detect that a certain power tool is stored at the property 22 if sound waves that have a certain amplitude above a threshold is detected at the property 22. In addition, the property owner may order a product via the smart speakers 24, thereby indicating to the inventory detection system 12 that the new product may be stored at the property. In another embodiment, software or an application associated with the smart speakers 24 may be utilized to coordinate an operation of the product via the smart speaker 24. The software may provide a notification to the inventory detection system 12 of the product.

In certain embodiments, sound profiles for various products (e.g., vacuum cleaners) may be stored in the database 14 or other storage medium. As such, the inventory detection system 12 may receive audio data from the smart speakers 24 and compare it to sound profiles stored in the database 14 to identify the product or device producing the sound. In some embodiments, detecting such sounds may be used as confirmation of data otherwise provided.

The vehicle 26 may provide the inventory detection system 12 with information related to the places or stores visited by an individual driving the vehicle 26. In some embodiments, the vehicle 26 may include image sensors that detect shopping bags or other objects that may be stored in the vehicle. As such, the inventory detection system 12 may use image recognition technology to identify objects stored in the vehicle 26. The image recognition technology may use a collection of images stored in the database 14 to identify the product that is present in the vehicle 26.

In addition to the collection of images and audio samples, the database 14 store other types of data. Before continuing, it should be noted that the database 14 may include any suitable database that may collect or store information concerning an individual, an organization, object, products, or the like. In some embodiments, the databases 14 may include account information related to a number of accounts within one or more financial institutions. The account information may include one or more balances for one or more accounts associated with a respective user, a credit limit for the respective user, a debt-to-asset ratio for the respective user, a risk profile for the respective user, and the like.

In addition to the information listed above for the account data, the databases 14 may also include a collection of documents or information that relate to a number of individuals, account holders, or the like. By way of example, the database 14 may include a collection of documents regarding insurance policies held for various pieces of property owned or leased by an individual, an organization, or the like. As such, the database 14 may provide documents or images that verify that an individual has an insurance policy for an automobile, home, or other property.

To perform one or more operations described herein, the inventory detection system 12 may include various types of components that may assist the inventory detection system 12 in performing the operations described below. For example, the inventory detection system 12 may include a processor 56, one or more image sensors 58, a communication component 60, a display 62, memory/storage 64, an input/output (I/O) port 66, and the like.

The processor 56 may be any type of computer processor or microprocessor capable of executing computer-executable code. The processor 56 may also include multiple processors that may perform the operations described below. The image sensor 58 may be a sensor capable of acquiring image data surrounding (e.g., environment) the inventory detection system 12. As such, the image sensor 58 may be a camera or other suitable image capturing device (e.g., scanner).

The communication component 60 may be a wireless or wired communication component that may facilitate communication between the inventory detection system 12, the databases 14, and various other computing systems via the network 16, the Internet, or the like. The display 62 may depict image data acquired by the image sensor 58 and visualizations associated with software or executable code being processed by the processor 56. In one embodiment, the display 62 may be a touch display capable of receiving inputs from a user of the inventory detection system 12. The display 62 may be any suitable type of display, such as a liquid crystal display (LCD), plasma display, or an organic light emitting diode (OLED) display, for example. Additionally, in one embodiment, the display 62 may be provided in conjunction with a touch-sensitive mechanism (e.g., a touch screen) that may function as part of a control interface for the inventory detection system 12.

The memory and the storage 64 may be any suitable articles of manufacture that can serve as media to store processor-executable code, data, or the like. These articles of manufacture may represent computer-readable media (e.g., any suitable form of memory or storage) that may store the processor-executable code used by the processor 56 to perform the presently disclosed techniques. As used herein, applications may include any suitable computer software or program that may be installed onto the inventory detection system 12 and executed by the processor 56. The memory and the storage 64 may represent non-transitory computer-readable media (e.g., any suitable form of memory or storage) that may store the processor-executable code used by the processor 56 to perform various techniques described herein. It should be noted that non-transitory merely indicates that the media is tangible and not a signal. The I/O ports 66 may be interfaces that may couple to other peripheral components such as input devices (e.g., keyboard, mouse), sensors, input/output (I/O) modules, and the like.

In addition to the inventory detection system 12, the mobile computing device 18, the computing device 20, as well as other suitable computing devices described herein may include the components described above for the inventory detection system 12. It should be noted that the components described above with regard to the inventory detection system 12 are exemplary components and the inventory detection system 12 may include additional or fewer components than shown.

Figure 3:
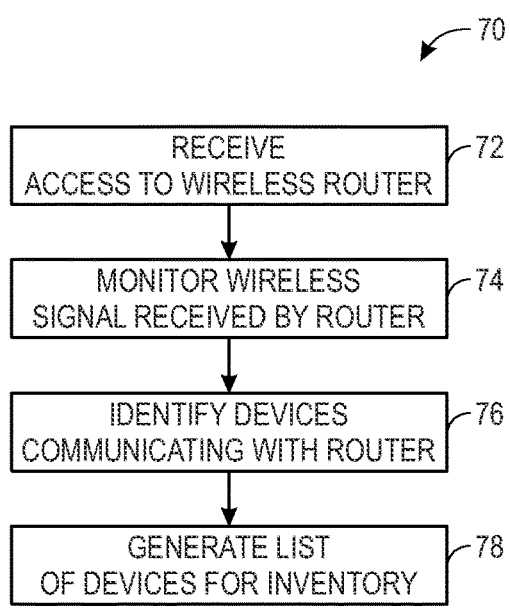
FIG. 3 illustrates a flow chart of a method for generating a list of items detected at a property via a router device, in accordance with embodiments described herein.

With the foregoing in mind, the present embodiments described herein may be utilized to assist in identifying objects and items that may be stored in the property 22 to ensure that a list of items may be regularly maintained and stored by the inventory detection system 12 to ensure that respective policies cover the items stored at the property 22. FIG. 3 illustrates a flow chart of an example method 70 that may be employed by the inventory detection system 12 to detect items that may be stored at the property 22. Before proceeding, it should be noted that the method 70 described below is described as being performed by the inventory detection system 12, but the method 70 may be performed by other suitable computing devices. In addition, although the method 70 is described in a particular order, it should be understood that the method 70 may be performed in any suitable order.

Referring now to FIG. 3, at block 72, the inventory detection system 12 may receive access to the router 28. The access to the router 28 may enable the inventory detection system 12 to monitor data packets received and transmitted to the various devices disposed at the property 22. The data packets communicated to the router 28 may include a media access control address (e.g., MAC address) of a device. The MAC address may correspond to an identifier within the network 16. In some embodiments, the MAC address may correspond to a particular manufacturer, product, or other identifying information that the inventory detection system 12 may use to detect the device stored in the property 22.

At block 74, the inventory detection system 12 may monitor the communication traffic received and transmitted via the router 28. As such, the inventory detection system 12 may log each packet communicated via the router 28 to keep a list of the data packets that the router 28 receives.

At block 76, the inventory detection system 12 may identify devices communicating with the router 28 based on the monitored communication traffic. In some embodiments, the inventory detection system 12 may use the MAC address specified in each data packet received by the router 28 to determine an identity of the device communicating with the router 28. If the MAC address corresponds to a particular manufacturer, the inventory detection system 12 may query the database 14 to determine various data packet properties (e.g., size, header, encryption method) that corresponds to different devices produced by the manufacturer. The inventory detection system 12 may identify a particular type of device communicating via the router 28 based on the properties of the respective data packet.

In other embodiments, the inventory detection system 12 organizes the log of packets received by the router 28 into distinct groups that correspond to different devices. That is, a group of data packets may be grouped together as being received by one particular device because the data packets are structured in a particular format (e.g., size, header). In addition, a group of data packets may be grouped together based on a frequency or time in which each respective data packet is received. That is, data packets received at regular time intervals may correspond to the same device sending the respective data packets.

Based on the groupings of the data packets, the inventory detection system 12 may determine a type of device that is communicating via the router 28. By way of example, the inventory detection system 12 may store the groups of data packets in the database 14 or other suitable storage component and identify the manufacturer of the devices sending the data packets or the type of device sending the data packets based on known patterns for various data packets. That is, the database 14 or other suitable storage component may store a list of properties that certain devices or manufacturers employ for data packets. Based on the properties of the group of data packets and a correlation with a particular property set listed in the list of properties, the inventory detection system 12 may identify the manufacturer or type of device that is sending the respective data packets.

In some embodiments, after logging a threshold amount of data packets having the same properties, the inventory detection system 12 may send a prompt or request to an application executing on the mobile computing device 18 or other suitable computing device to seek input regarding the source of the data packets. That is, the inventory detection system 12 may receive an input via the mobile computing device 18 that designates a device type, product name, or other suitable identifier for the group of data packets. After receiving this indication, the inventory detection system 12 may store data indicative of the relationship between the properties of the group of data packets and the identifier in the database 14 or other suitable storage component, such that other inventory detection systems 12 may identify the devices without receiving the input from the user.

In some embodiments, the inventory detection system 12 may detect that a group of data packets may be routed via a particular application or device (e.g., intermediate router) that controls the operation or monitors the operation of certain devices. For example, an application may be stored on the mobile computing device 18 and may control the operation of lights disposed in the property 22, alarm systems that secure the property 22, air conditioning systems that heat and cool the property 22, and the like. Each of these devices may be controlled according to a schedule or particular command (e.g., spoken command) through an application that can interface or communicate with a number of different devices manufactured by different entities. When these devices are initialized to be configured or controlled by the respective application, the application receives an indication of the type of devices that it now can control. In some embodiments, the inventory detection system 12 may send a request for access to the list of devices controlled or monitored by these types of applications to determine the devices that may be stored in the property 22.

In other embodiments, a user of the application that controls the operations of various devices in the property 22 may provide a screen shot or image that lists the devices that are accessible to the application. The inventory detection system 12 may then parse or analyze the image data to identify the products or devices stored in the property 22 based on the list of devices controllable via the respective application.

After identifying the devices communicating with the router 28, at block 78, the inventory detection system 12 may generate a list of the identified devices as a list of inventory for the property 22. The inventory detection system 12 may employ the inventor list to determine an insurance policy to cover the identified devices. In addition, the inventory detection system 12 may perform the method 70 (or other methods described below) at regular intervals to update an existing insurance policy that covers the detected items in the property 22.

With the foregoing in mind, in some embodiments, the inventory detection system 12 may interact with an application that controls the operation of devices via the smart speaker 24 to identify the items or devices stored at the property 22. As such, the inventory detection system 12 may use the audio data acquired by the smart speaker 24 to identify other devices and items that may be present at the property 22. For example, FIG. 4 illustrates a flow chart of a method 80 for detecting items stored at the property 22 based on audio data and image data acquired by devices disposed at the property 22.

As mentioned above with respect to FIG. 3, it should be noted that the method 80 described below is described as being performed by the inventory detection system 12, but the method 80 may be performed by other suitable computing devices. In addition, although the method 80 is described in a particular order, it should be understood that the method 80 may be performed in any suitable order.

Figure 4:
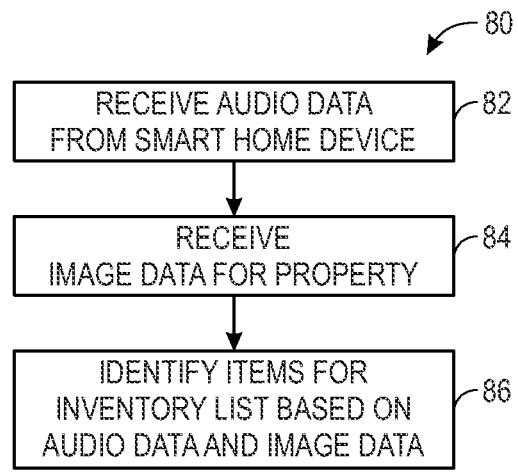
FIG. 4 illustrates a flow chart of a method for generating a list of items detected at a property based on audio data and image data acquired via sensors at the property, in accordance with embodiments described herein.

Referring now to FIG. 4, at block 82, the inventory detection system 12 may receive audio data acquired via the smart speaker 24. The audio data may include voice commands that control operations of different devices in the property 22. The voice commands may indicate the presence of a certain device that may be controllable or accessible via the smart speaker 24.

At block 84, the inventory detection system 12 may receive image data related to the property 22. The image data may be acquired by image sensors 32 (e.g., cameras) positioned at various locations in and around the property 22. In some embodiments, the image data may include thermal image data, infrared image data, or other types of image data that may be representative of objects or items disposed in view of the respective image sensor 32.

At block 86, the audio data received at block 82 may identify items that may be present at the property 22 based on the audio data and the image data received at blocks 82 and 84. That is, the inventory detection system 12 may use the audio data received at block 82 to confirm that the device identified or detected in the image data received at block 84 is indeed present at the property 22. In the same manner, the inventory detection system 12 may use the image data received at block 84 to confirm that the device identified or detected in the audio data received at block 82 is indeed present at the property 22.

After identifying the items based on the audio data and the image data, the audio data received at block 82 may generate the list of items stored at the property 22, as described above in block 78. The list of items may then be used to generate or update an insurance policy to cover the identified items.

In addition to using the audio data acquired by the smart speaker 24 to verify objects identified in image data acquired by the image sensor 32, or vice versa, the present embodiments described herein may involve using various types of data received by the inventory detection system 12 to verify the presence of detected items. For example, FIG. 5 illustrates a flow chart of a method 90 for generating a list of inventory items based on various types of data received by the inventory detection system 12.

As mentioned above with respect to FIGS. 3 and 4, it should be noted that the method 90 described below is described as being performed by the inventory detection system 12, but the method 90 may be performed by other suitable computing devices. In addition, although the method 90 is described in a particular order, it should be understood that the method 90 may be performed in any suitable order.

Figure 5:
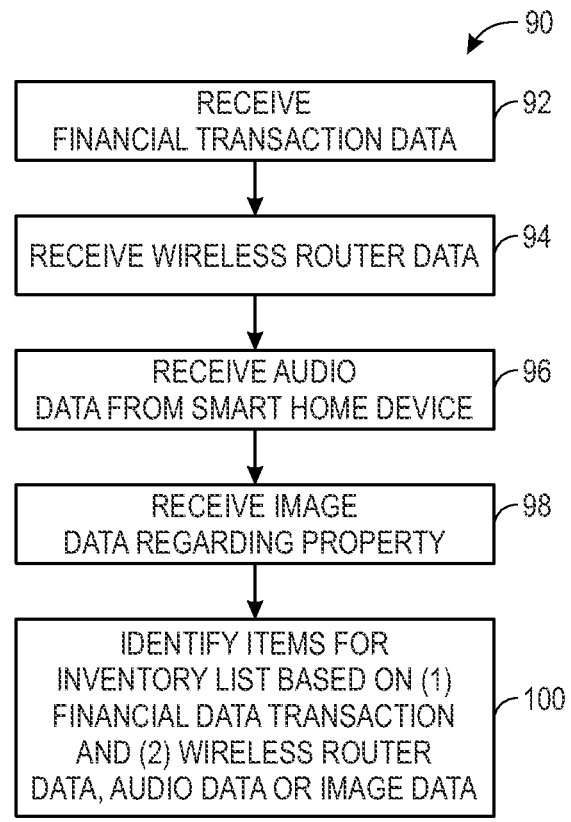
FIG. 5 illustrates a flow chart of a method for generating a list of items detected at a property based on a correlation between financial transaction data and other data acquired via sensors at the property, in accordance with embodiments described herein.

Referring now to FIG. 5, at block 92, the inventory detection system 12 may receive financial transaction data as described above with reference to FIG. 1. The financial transaction data may include data from businesses, credit card companies, banking companies, and other financial organizations that are associated with the spending and/or assets of an individual that owns the property 22. The financial transaction data may detail an amount in which one or more purchased items may cost, a description of each of the purchased items, and the like. In some embodiments, the financial transaction data may provide a store name and amount charged or paid to the store.

Based on the name of the store, the inventory detection system 12 may determine a list of products that may be sold by the store and may have been purchased by the individual. In some embodiments, the database 14 or other suitable storage component may include a list of stores and a corresponding list of devices sold at each store of the list. The inventory detection system 12 may refer to this stored list when confirming whether a particular item identified via other data acquired by the inventory detection system 12 is stored at the property 22.

At block 94, the inventory detection system 12 may receive data monitored from the router 28, as discussed above with respect to block 74. In addition, at block 96, the inventory detection system 12 may receive the audio data discussed above with respect to block 82. Similarly, at block 98, the inventory detection system 12 may receive image data as described above with respect to block 84.

Based on the financial transaction data receive at block 92 and at least one of the datasets received at blocks 94, 96, and 98, the inventory detection system 12 may, at block 100, identify items that may be stored or located at the property 22. That is, the inventory detection system 12 may determine items that may have been purchased according to the financial transaction data received at block 92 and verify whether these items were indeed purchased or are stored at the property 22 based on the data received at blocks 94, 96, and/or 98. In this way, the recently purchased items that may be gifts or purchased for a different property may not be identified as an item that is stored at the property 22.

After determining the items that are stored at the property based on the data received at blocks 92, 94, 96, and 98, the inventory detection system 12 may generate a list of devices or items stored at the property 22 as described above with reference to block 78. In addition, the list of items stored at the property 22 may then be utilized to generate insurance policies or update existing policies to cover the items that are stored at the property 22 more than a threshold percentage of time.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
   at least one processor configured to perform operations comprising:
   receiving one or more data packets from a device;
   identifying an identity of the device based on the one or more data packets;
   determining whether the identity of the device corresponds to an inventory list;
   receiving image data associated with the device via one or more sensors;
   confirming the identity of the device based on the image data, wherein confirming the identity of the device comprises:
   querying a database using the image data, wherein the database comprises a plurality of images, and wherein the plurality of images is associated with one or more device types; and
   confirming the identity of the device based on the plurality of images and the one or more device types;
   generating an insurance policy that includes the device in response to determining the identity of the device is absent from the inventory list and confirming the identity of the device; and
   sending a notification indicative of the insurance policy to a computing device in response to generating the insurance policy.

2. The system of claim 1, wherein the at least one processor is configured to perform the operations comprising:
   receiving audio data representative of the device; and
   verifying a presence of the device based on the audio data.

3. The system of claim 2, wherein the audio data is received via one or more smart speakers.

4. The system of claim 1, wherein the one or more sensors are disposed in a vehicle.

5. The system of claim 1, wherein the one or more sensors comprise one or more thermal sensors, one or more infrared sensors, or both.

6. The system of claim 1, wherein the image data comprises thermal image data, infrared image data, or both.

7. The system of claim 1, wherein the at least one processor is configured to perform the operations comprising:
   receiving financial transaction data indicative of a purchase of the device; and
   verifying that the device is present based on the financial transaction data.

8. A method, comprising:
   receiving, via a processor, one or more data packets from a device;
   identifying, via the processor, an identity of the device based on the one or more data packets;
   determining, via the processor, whether the identity of the device corresponds to an inventory list;
   receiving, via the processor, image data via one or more sensors;
   confirming, via the processor, an identity of the device based on the image data, wherein confirming the device comprises:
   querying a database using the image data, wherein the database comprises a plurality of images, and wherein the plurality of images is associated with one or more device types; and
   confirming the identity of the device based on the plurality of images and the one or more device types;
   generating, via the processor, an insurance policy that includes the device in response to determining that the identity of the device is absent from the inventory list and confirming the identity of the device; and
   sending, via the processor, a notification indicative of the insurance policy to a computing device in response to generating the insurance policy.

9. The method of claim 8, wherein the device is identified based on one or more properties of the one or more data packets, wherein the one or more properties comprise a size, a header, an encryption method, or any combination thereof.

10. The method of claim 8, comprising receiving financial information associated with a purchase of the device and identifying the device based on the financial information.

11. The method of claim 8, wherein the one or more sensors are disposed in a vehicle.

12. The method of claim 8, wherein the one or more sensors comprise one or more thermal sensors, one or more infrared sensors, or both.

13. The method of claim 8, wherein the image data comprises thermal image data, infrared image data, or both.

14. The method of claim 8, comprising:
receiving audio data representative of the device; and
verifying a presence of the device based on the audio data.

15. A non-transitory computer-readable medium comprising computer-executable instructions that, when executed, cause a processor to perform operations comprising:
receiving one or more data packets from a device;
identifying an identity of the device based on the one or more data packets;
determining whether the identity of the device corresponds to an inventory list;
receiving image data produced associated with the device;
receiving image data via one or more sensors disposed at a plurality of locations in a structure;
confirming an identity of the device based on the image data, wherein confirming the device comprises:
querying a database using the image data, wherein the database comprises a plurality of images, and wherein the plurality of images is associated with one or more device types; and
confirming the identity of the device based on the plurality of images and the one or more device types;
generating an insurance policy that includes the device in response to determining that the identity of the device is absent from the inventory list and confirming the identity of the device; and
sending a notification indicative of the insurance policy to a computing device in response to generating the insurance policy.

16. The non-transitory computer-readable medium of claim 15, wherein the image data comprises thermal image data, infrared image data, or both.

17. The non-transitory computer-readable medium of claim 15, wherein the computer-executable instructions that cause the processor to perform the operations comprises verifying a presence of the device using financial data acquired from a database associated with an organization that sells the device.

18. The non-transitory computer-readable medium of claim 15, wherein the computer-executable instructions that cause the processor to perform the operations comprises verifying a presence of the device using router data acquired from a router communicatively coupled to the device.

19. The non-transitory computer-readable medium of claim 15, wherein the one or more sensors comprise one or more image sensors.

20. The non-transitory computer-readable medium of claim 15, wherein the one or more sensors are disposed in a vehicle.

\* \* \* \* \*